(No Model.)
H. R. SCHURTER.
NUT LOCK.
No. 577,210. Patented Feb. 16, 1897.
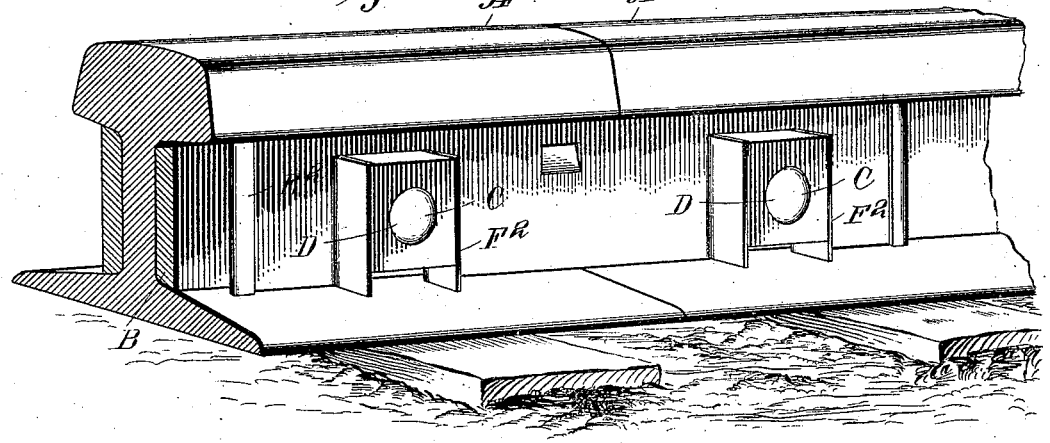
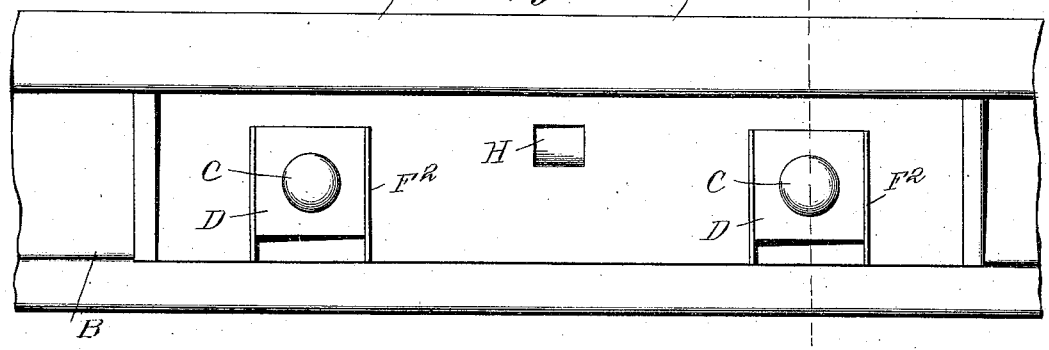
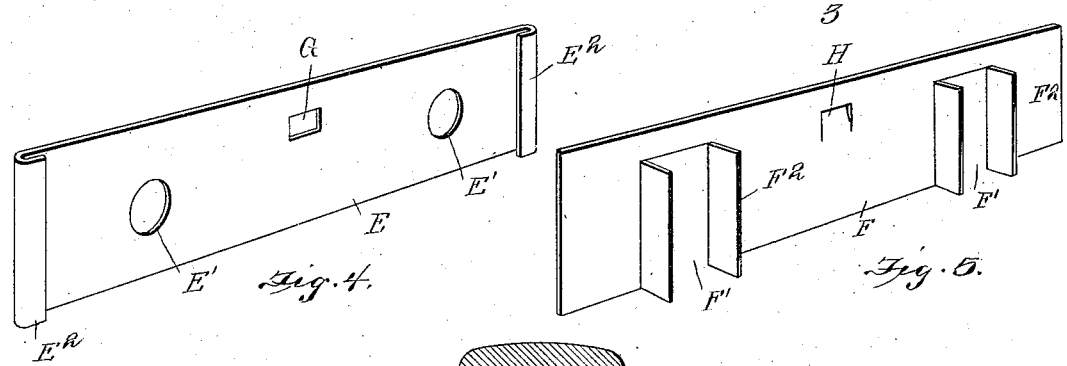
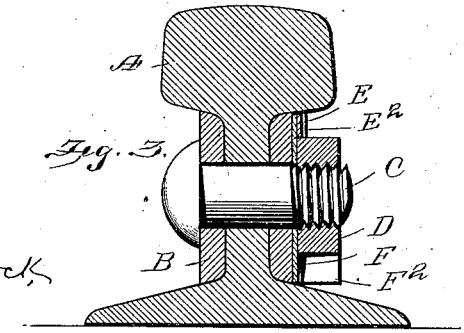
WITNESSES:
P. W. Riley
Chas. E. Brock
INVENTOR
H. R. Schurter
BY O'Meara & Co.
ATTORNEYS

UNITED STATES PATENT OFFICE.

HENRY R. SCHURTER, OF NORTH DECATUR, GEORGIA.

NUT-LOCK.

SPECIFICATION forming part of Letters Patent No. 577,210, dated February 16, 1897.

Application filed July 20, 1896. Serial No. 599,888. (No model.)

*To all whom it may concern:*

Be it known that I, HENRY R. SCHURTER, residing at North Decatur, in the county of De Kalb and State of Georgia, have invented a new and Improved Nut-Lock, of which the following is a specification.

This invention is a new and useful nut-lock or device for preventing a nut from working loose upon a bolt.

Nuts used upon railroads, bridges, and the like are subjected to constant jarring and soon work loose; and the object of my invention is to provide a lock which shall be exceedingly cheap and simple in construction, quick and easy of manipulation, and one which will successfully perform all of its intended functions.

Another object is to provide a nut-lock which can be used upon a single nut or a series of nuts at one time; and a still further object is to provide a nut-lock which can be secured against dislodgment, but can be easily removed by any one acquainted with its construction; and a still further object is to economize in the use of metal in constructing the device.

With these various objects in view my invention consists in the peculiar construction of the several parts and in their novel combination and arrangement, all of which will be fully described hereinafter and pointed out in the claim.

In the drawings forming a part of this specification, Figure 1 is a view showing my invention applied to a railroad-rail. Fig. 2 is a face view. Fig. 3 is a section on the lines 3 3 of Fig. 2. Figs. 4 and 5 show the washer and locking-plates, respectively.

Referring now to the accompanying drawings, in which like letters of reference indicate similar parts in all the figures, A indicates the meeting ends of two rails, and B the usual form of fish-plate, and passing through these rails and fish-plates are the bolts C, upon which are screwed the nuts D, all of the usual construction.

Between the fish-plate and nuts is a washer-plate E, having bolt-holes E', so that said plate can be fitted upon the bolts. The ends of this plate are bent over toward the front, as shown at $E^2$, to form guideways and keepers for the locking-plate F, which fits upon said washer-plate, and has slots F' cut in the bottom side, so that said plate can slide over the nuts, and the sides of said slots are turned up, as shown at $F^2$, providing flanges which bear upon the side of this nut and thereby hold the same against rotation.

It is obvious that my device can be used upon one nut or a series of nuts, and for the purpose of illustration I have selected two nuts. The washer and locking-plates can be made from thin sheet metal and can therefore be made at a very small cost.

In order to prevent the dislocation of the locking-plate, I provide an opening G in this washer-plate E and construct the locking-plate F with a tongue H, which is punched out from the body of the plate, and when the plates are in proper position this tongue is pressed inward into the opening and prevents upward movement. It can be moved, however, by an operator acquainted with its construction and provided with the proper tools.

Now in operation the fish-plates are set in place, the bolts passed through, and the washer-plate set in place. The nuts are then screwed down, and then the locking-plate set into position and secured.

It will thus be seen that I provide an exceedingly cheap and simple device, and one which will securely hold the nuts against turning upon the bolts.

Having thus described my invention, what I claim, and desire to secure by Letters Patent, is—

In a nut-lock the combination with a washer-plate, E, having the bolt-holes, E', and the end guides, $E^2$, said plate also having an opening, G, of the locking-plate, F, having the slots, F', the sides of which are bent outwardly at $F^2$, said plate being adapted to slide in the ways or end guides, $E^2$, and provided with an integral tongue, H, adapted to be passed into the opening, G, substantially as shown and described.

HENRY R. SCHURTER.

Witnesses:
CHAS. A. DYER,
L. W. CHEEK.